Aug. 25, 1942.  L. G. MORTEN ET AL  2,293,911
ELECTRICITY CONDUCTOR MEANS
Filed Sept. 27, 1939
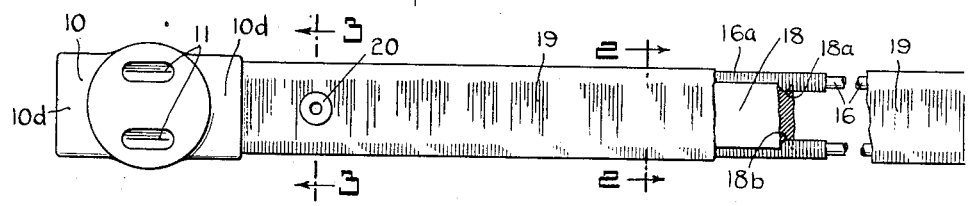
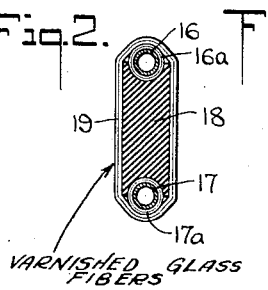
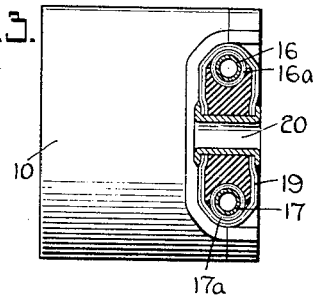
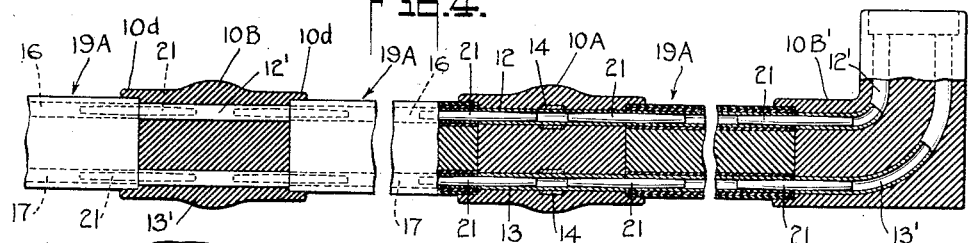
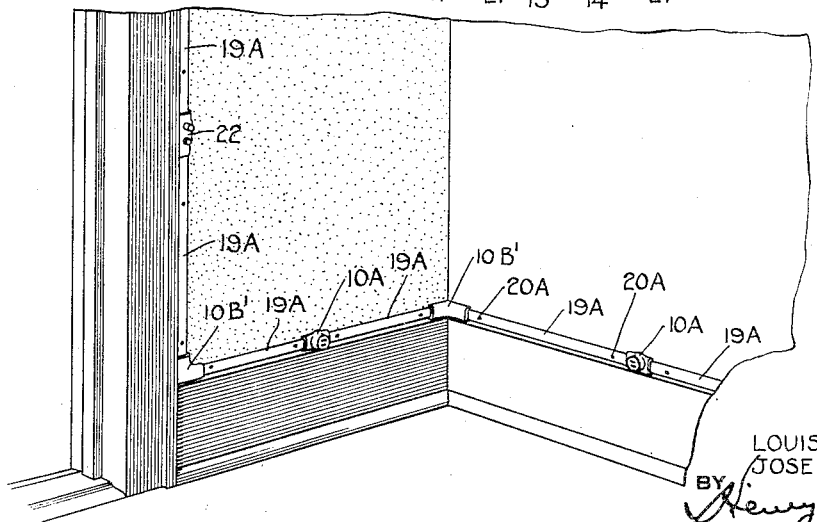
INVENTORS
LOUIS G. MORTEN
JOSEPH F. O'BRIEN
THEIR ATTORNEY Patented Aug. 25, 1942

2,293,911

UNITED STATES PATENT OFFICE 2,293,911

ELECTRICITY CONDUCTOR MEANS

Louis G. Morten, Teaneck, and Joseph F. O'Brien, Jersey City, N. J., assignors to John B. Pierce Foundation, New York, N. Y., a corporation of New York Application September 27, 1939, Serial No. 296,752

1 Claim. (Cl. 174—117)

The present invention relates to outlet-provided electrical conductors and conductor systems.

Pursuant to the present invention, such electrical conductor means comprises the required number of electrical conductors, assembled as hereinafter more specifically set forth, and preferably having flat longitudinal faces.

More particularly, embodiments of the invention comprise, say, two electrical conductors, one of which may be the "hot" wire and so suitably designated, assembled with suitable means for suitably spacing and suitably insulating the individual electrical conductors relative to one another, and adapted for interconnection with an electrical outlet, of conventional or other preferred construction, the aforesaid being arranged to be per se installed at any desired location, such as upon the face of a building wall or the like, including passage through walls, over window and door sills, and like locations of installation. Such electrical outlet is advantageously disposed at one end of an indefinite length of conductor means.

Other embodiments of the invention may comprise a plurality of electrical conductor means or lengths, constituting units of either uniform or other standard longitudinal dimensions, each unit embodying insulatedly comprised electrical conductors having exposed terminals extending beyond the body of the unit, the respective units being assembled in seriatim by mere insertion of the exposed terminals into suitable electrical terminals of immediately adjacent units. By such seriatim arrangement the units are interconnected mechanically as well as electrically.

Desirably, the individual electrical conductors are tubing, preferably of copper. However, the individual electrical conductors may be wire of copper or other suitable conducting material having tubular socket terminals for reception of pin-like or other electrical elements interconnecting such tubular socket terminals with the proper conducting elements of adjacent units.

Advantageously, the dimensions of the respective units other than their longitudinal dimension, particularly the dimensions exposed to visual observation when installed, are uniform, to thereby present a substantially uniformly continuous contour, rendering the same adaptable as a molding and for other purposes of artistic effects.

Desirably, such tubular or solid electrical conductors extending through the body of such electrical conductor means or units are of minimum diameter to afford a degree of flexing of the body, to enhance the facility of installation, i. e., turning about corners or the like, passing over sills and frames of windows, doorways and the like.

A preferred assembly of the individual parts may be comprised in embodiments of the invention, had by helically winding or otherwise suitably applying insulation, such as glass fibre about the individual electrical conductors, the insulation about the conductors being usually distinctive; such insulatedly wound conductors are secured in proper mutually spaced relation, as by mounting the same at opposing faces of a supporting, desirably insulating, member; the configuration of such member and therewith assembled plurality of electrical conductors is such as to result in a flat longitudinal face, desirably at the rear longitudinal face to thereby facilitate securement to the face of a wall or the like. Such supporting member is preferably of flexible material, such as rubber compound or composition material. Such assembly of insulated electrical conductors and supporting member is suitably wholly enclosed by suitable material, preferably possessing yieldable and electrical insulating qualities, such as glass spun fibre or fabric, locally affixed in position by varnish, shellac or flexible lacquer or the like affording protection against scuffing. Such locally affixed outer enclosing member effects the securement of the electrical conductors in mutually spaced position and insulatedly supported relation to the flexible supporting means for variant positions of the body of the electrical conductor means or unit.

As one means of positioning such assembly at any desired location of installation, eyelets or the like entered in perforations at desired intervals in the strip of the supporting member, afford the reception of nails, screws, or other fastening elements.

Glass spun fibre or fabric serves admirably as insulating material in the assembly of the invention by reason of its dielectric qualities, pliability and surface smoothness.

In lieu of rubber compound or composition, the supporting member may be of cellulosic or other material suitably treated for pliability, waterproofness and, if desired, for dielectric qualities.

For a two-conductor assembly, optimum arrangement is had by employing a flat strip as the supporting member and supporting the conductors at the opposite longitudinal edges of the strip.

Further features and objects of the invention will be more fully understood from the following detail description and the accompanying drawing, in which Fig. 1 is a plan view of one embodiment of the invention, a portion thereof being broken away to expose otherwise hidden parts.

Fig. 2 is a sectional elevation on line 2—2 of Fig. 1, on an enlarged scale.

Fig. 3 is a sectional elevation on line 3—3 of Fig. 1, on an enlarged scale.

Fig. 4 is a sectional view on a lengthwise plane, illustrating another embodiment of the invention, namely of interconnected unit assembly type.

Fig. 5 is a perspective view, largely diagrammatic, illustrating a manner of application of use of the invention, and in particular the type of the invention shown in Fig. 4.

Referring to the drawing, Fig. 1 shows in plan and Figs. 2 and 3 in perspective transverse sections, a type of the invention affording any desired length for the body of the electrical connector means. In such embodiment, at one end, say, at the left-hand end illustrated in Fig. 1, is provided an electrical outlet 10 having openings 11, 11, for receiving the terminals of an electrical plug of conventional or other approved construction.

The body of the electrical conductor means, as shown in Figs. 1, 2, 3 and 5, comprises electrical conductors 16, 17, which are mounted in proper electrical spaced relation and protected to afford electrical insulation to eliminate fire hazard and afford protection against electrical shocks to humans, and otherwise satisfy electrical code requirements.

As one form of a two conductor assembly, such two conductors, 16, 17, may be covered by helically winding suitable insulation 16a, 17a, such as glass spun fibre, or applying glass or other fabric; such insulating coverings may be distinctive in color, if desired to indicate charged and grounded wires. The proper spacing and mounting for such electrical conductors, as appears from Figs. 1, 2 and 3, is had by employment of a supporting member 18, preferably of rubber or like flexible material, affording also electrical insulation, the edges 18a, 18b of which are preferably grooved or equivalent to afford secured positioning of the two electrical conductors 16, 17, thereat. The body of the electrical conductor means may be completed by the application of an exterior covering 19, such as wound spun glass fibre or enclosing fabric possessing the attribute of resisting chafing, ensuing as when the length is passed through openings in a wall, floor and the like pursuant to the conventional method of "fishing" an electrical cable or other wiring. Such attribute of resistance against chafing also renders the body of the material immune against damage arising when struck by the frame of a carpet sweeper, vacuum cleaner, contacted by a shoe or other personal clothing, etc. Such fibre or fabric may be secured in position by a coating of shellac, varnish or the like, serving also to close all voids in the outer insulating covering.

Desirably, the cross-sectional dimension of the conductors 16, 17, the thickness dimension of the supporting member 18 and the insulation 16a, 17a and outer covering 19 is such that the body of the resulting electrical conductor means is relatively pliable to thereby afford bending and/or twisting of the body without disturbance of the electrical insulated relationship of the conductors 16, 17 relative to one another for variant flexed positions of the body.

To afford ready securement of the conductor body to the surface of a wall and other structural parts of a building the rear longitudinal face is preferably flat, suitable means for receiving screws, nails or like fastening elements are provided, such as eyelets 20 which may be of metal, which are passed through suitable openings formed in the supporting member 18 and swaged therein under pressure, as will be understood by those skilled in the art. The helically wound or other externally applied covering 19 is displaced at the locations of such eyelets 20 or the like, to preserve continuity of the covering material 19.

The conductors 16, 17, of the body of the electrical conductor means and also the conductors 12, 13, of the outlet 10 may be tubing, in which arrangement the mechanical connection between the body and the outlet and also electrical connection between conductors of like polarity may be had by means of conductor pins frictionally received at and within the abutting terminal portions of the respective conductors. Such interconnecting conductor pins are described more specifically and shown, as appears hereinafter, in respect to the type of embodiment shown in Fig. 4.

The conductor means, as typified in Fig. 1, may have the terminals at both ends of the electrical conductors extending beyond the body, or only at one end thereof, as at the left hand end as viewed in Fig. 1, to facilitate insertion of the respective terminals into terminal sockets of any suitable therewith connected electrical device.

Referring now to the type of embodiment of the invention shown in Fig. 4, and illustrated as to one manner of use as a molding for a floor base board, the electrical conductor means is comprised of seriatim related units, each unit comprising a body designated 19A enclosing an assembly of parts and constructed as hereinabove described, in relation to the body of the embodiment of Figs. 1, 2, and 3. The component units of the embodiment of Fig. 4 are shown as having uniform length and generally of uniform cross-sectional dimensions, vide Fig. 5, to present visually substantially uniform continuity of appearance. Such units may be of two types, with or without an electrical outlet. Such electrical outlets in Figs. 4 and 5 are designated 10A. Such outlets 10A may have the construction of the outlet 10 of Figs. 1, 2, and 3. The non-outlet provided type of unit has in lieu of an outlet a mechanical and electrical connecting member 10B which corresponds in component parts and construction to the outlet 10 but devoid of plug-terminal receiving openings 11, 11, that is to say, having solid frontal walls. Such non-outlet provided type may serve as an angle or corner interconnecting member as indicated at 10B', see Figs. 4 and 5. The preferably tapered, frictional connector to conductor interconnecting pins, referred to also above in relation to Figs. 1, 2, and 3, are designated in Fig. 4, as 21.

The individual electrical conductors of the non-outlet provided members 10B and 10B' are designated 12' and 13'.

The member 22, see Fig. 5, indicates an electrical switch member, the contacts and terminals of which are suitably connected to the electrical conductors of the immediately adjacent units, for closing a circuit through the unit 19A' and therewith connected unit or electrical conductor means such as in Figs. 1, 2, and 3, which may lead to an electrical lighting lamp, electrical fan or the like.

As appears from Fig. 4, and representing a preferred construction of the body of the outlet 10, of Figs. 1 and 3, a socket-like formation 10d is provided at the edges of the opposite ends of the body of the outlet, to preclude mechanical spacing and separation thereat with the abutting end of the unit body in which the electrical conductors 16, 17, are insulatedly mounted, thus precluding entry from the exterior of foreign matter such as dirt, washing fluid, careless insertion of metallic object, or the like.

From the above, it appears that the invention provides for electrical conductor means either in strip or seriatim connected unit form comprising a body possessing pliable or flexing characteristics and constituted of the desired number of individual electrical conductors mutually spacedly and electrically insulatedly supported by a strip or unit length of flexible material, such electrical conductors and supporting strip or unit length being enclosed and protected by yieldable material, preferably insulating fibre or fabric affixed in position locally throughout by suitable flexing medium, whereby at variant flexed positions of the body the outer enclosing material is maintained intact and the enclosed electrical conductors preserved in proper mutually spaced relation and secured supported positions relative to the supporting member.

In the use of the strip type of the invention, indicated by the embodiment shown in Figs. 1, 2, and 3, the free end or ends may be denuded of the outer covering material and the individual conductors bared of insulating covering by employment of a knife or like instrument.

In embodiments of the invention of the type illustrated in Figs. 1, 2, and 3, using a flat supporting member and supporting two electrical conductors at its longitudinal edges, a third conductor or additional conductors may be positioned at the frontal face of the supporting member, desirably in individual grooves or equivalent to thereby present when assembled a flat frontal longitudinal face, as well as a flat rear longitudinal face.

Whereas the invention has been described by reference to specific forms thereof, it will be understood that many changes and modifications may be made without departing from the spirit of the invention.

We claim:

Electricity conductor means comprising a spacer strip of flexible insulation material having a width exceeding its depth and a substantially hemi-cylindrical groove formed in each of its edge walls, an electricity conductor positioned within each of said grooves, a smooth, hard outer insulating envelop of spun glass fiber securing said conductors within said grooves, said spun glass fiber envelop being coated with varnish or like hard-setting material to close voids in such outer insulating envelop and enhance the smoothness thereof, and tubular eyelet means passing through said spun glass fiber envelop and said spacer strip at spaced intervals along said conductor means in insulated relationship with respect to said conductor means, and swaged in position under pressure to securely anchor said spun glass fiber envelop at said spaced intervals.

LOUIS G. MORTEN.
JOSEPH F. O'BRIEN.